(12) United States Patent
Wolf-Monheim

(10) Patent No.: US 10,792,969 B2
(45) Date of Patent: Oct. 6, 2020

(54) LONGITUDINAL LEAF SPRING DEVICE FOR SUSPENSION OF A MOTOR VEHICLE BODY

(71) Applicant: FORD GLOBAL TECHNOLOGIES, LLC, Dearborn, MI (US)

(72) Inventor: Friedrich Peter Wolf-Monheim, Aachen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 16/162,817

(22) Filed: Oct. 17, 2018

(65) Prior Publication Data
US 2019/0111750 A1 Apr. 18, 2019

(30) Foreign Application Priority Data
Oct. 17, 2017 (DE) .................. 10 2017 218 530

(51) Int. Cl.
*B60G 11/10* (2006.01)
*F16F 1/22* (2006.01)
*B60G 11/04* (2006.01)

(52) U.S. Cl.
CPC .............. *B60G 11/10* (2013.01); *B60G 11/04* (2013.01); *F16F 1/22* (2013.01); *B60G 2200/30* (2013.01);
(Continued)

(58) Field of Classification Search
CPC .. B60G 11/10; B60G 11/04; B60G 2206/821; B60G 2200/30; B60G 2500/22; B60G 2204/1432; B60G 2206/7101; B60G 2206/428; B60G 2204/4302; B60G 2204/143; B60G 2204/121;
(Continued)

(56) References Cited

U.S. PATENT DOCUMENTS 3,580,347 A * 5/1971 McGee .................. B60G 5/047
180/22
5,209,518 A * 5/1993 Heckenliable ......... B60G 5/047
267/36.1
(Continued)

FOREIGN PATENT DOCUMENTS

DE 102010056388 A1 6/2012
JP 2011073625 A 4/2011
(Continued)

*Primary Examiner* — Darlene P Condra
(74) *Attorney, Agent, or Firm* — Raymond L. Coppiellie; Brooks Kushman P.C.

(57) ABSTRACT

The disclosure relates to a longitudinal leaf spring device for suspension of a body of a motor vehicle. and the longitudinal leaf spring device comprises a longitudinally formed leaf spring element and a coupling device that mechanically couples the leaf spring element to a motor vehicle axle. According to the disclosure, a holder device is provided that has a base holder element for fixed connection to a vehicle chassis and a suspension adjustment element that faces the leaf spring element and is fixedly connected to the base holder element. In this case, the leaf spring element is connected in a front region, fixedly to the base holder element, and the front region is provided to come into mechanical bearing with the suspension adjustment element in at least one operating state.

10 Claims, 2 Drawing Sheets

(52) U.S. Cl.
CPC .. *B60G 2202/112* (2013.01); *B60G 2204/121* (2013.01); *B60G 2204/143* (2013.01); *B60G 2204/1432* (2013.01); *B60G 2204/4302* (2013.01); *B60G 2206/428* (2013.01); *B60G 2206/7101* (2013.01); *B60G 2206/821* (2013.01); *B60G 2500/22* (2013.01)

(58) Field of Classification Search
CPC .... B60G 2202/112; B60G 11/113; F16F 1/22; F16F 1/26; F16F 1/185
See application file for complete search history.

(56) References Cited

U.S. PATENT DOCUMENTS

| | | | | |
|---|---|---|---|---|
| 5,354,091 | A * | 10/1994 | Baxter | B60G 5/03 |
| | | | | 267/37.2 |
| 6,679,517 | B2 * | 1/2004 | Proia | B60G 11/10 |
| | | | | 280/682 |
| 8,434,747 | B2 | 5/2013 | Dudding et al. | |
| 9,457,998 | B1 * | 10/2016 | Easterly | B66F 7/243 |
| 2003/0038445 | A1 | 2/2003 | Sutton et al. | |
| 2008/0303237 | A1 * | 12/2008 | Preijert | B60G 3/285 |
| | | | | 280/124.125 |

FOREIGN PATENT DOCUMENTS

| | | |
|---|---|---|
| KR | 20070111045 A | 11/2007 |
| WO | 2016099343 A1 | 6/2016 |

* cited by examiner

LONGITUDINAL LEAF SPRING DEVICE FOR SUSPENSION OF A MOTOR VEHICLE BODY

CROSS-REFERENCE TO RELATED APPLICATIONS

This application claims foreign priority benefits under 35 U.S.C. § 119(a)-(d) to DE Application 10 2017 218 530.9 filed Oct. 17, 2017, which is hereby incorporated by reference in its entirety.

TECHNICAL FIELD

The disclosure relates to a longitudinal leaf spring device for suspension of a body of a motor vehicle.

BACKGROUND

It is known in the field of motor vehicle technology to use elastic spring elements between a body of a motor vehicle as an object with suspension, and wheels of the vehicle as objects without suspension in order to improve travelling comfort for vehicle occupants by virtue of the fact that impacts caused by unevenness of a ground are not transmitted directly to a car body. Contact of the wheels with the ground, required for a transmission of force, can furthermore be ensured even in the case of uneven ground. Vibrations of the car body generated by uneven ground are damped in a familiar manner by using shock absorbers that are arranged between the car body and wheel axles. The elastic spring elements can be formed, for example, by elastic spiral springs and be an integral component of the shock absorbers.

Use of leaf spring arrangements is furthermore known in the field of a suspension of motor vehicles. A leaf spring is generally formed as a bent longitudinal rod, for example, composed of steel, with a rectangular cross-section and arranged in the vehicle with a direction of extent substantially parallel to a direction of extent of the vehicle. Here, the leaf spring is slightly bent in an unloaded state, i.e. not necessarily parallel to the direction of extent of the vehicle. The leaf spring arrangement can furthermore be fastened with its central region on a vehicle axle and each of its ends can be fastened to a vehicle chassis.

For example, JP 2011073625 A describes a structure for supporting a leaf spring, by which travelling comfort of the driver is improved, which has outstanding durability and furthermore reduces production costs in a simple vehicle structure in the case of which an axle of a vehicle body is suspended via a leaf spring.

The structure for supporting the leaf spring comprises a vehicle body frame, which forms a part of the vehicle body and extends in a longitudinal direction of the vehicle body, and a retaining element, which is fastened to the vehicle body frame, with a carrier element with a spring seat, wherein the carrier element regulates movement of a front end and a rear end of the leaf spring in a vertical direction of the vehicle, and supports the leaf spring displaceably in the longitudinal direction on s spring seat. A profile of a retaining element running transversely in relation to the longitudinal direction forms, with a profile of the vehicle body frame, a closed cross-sectional surface so that the leaf spring is reliably guided within a support structure and a spring deflection of the leaf spring is restricted, as a result of which travelling comfort can be improved.

A progressive characteristic curve of the springs used is desirable for the suspension of motor vehicles in order to provide a high level of travelling comfort in the case of a normal load, and in the event of a high load, for example, in the case of an uneven carriageway, to be able to avoid a deflection of the suspension up to an end stop so that potholes do not "penetrate through" to a vehicle chassis. Various solutions have been proposed in the prior art in order to achieve a progressive spring characteristic curve.

For example, U.S. Pat. No. 8,434,747 B2 describes an HGV wheel suspension with installed asymmetrical leaf springs, as a result of which a lightweight, low-cost axle suspension can be provided by combining a high torsional stiffness of a hollow axle body with a torsional action of the leaf springs attached to the axle. The suspension system is provided to support front and rear frame parts of a vehicle chassis on a hollow axle, wherein a system of one side of the vehicle is duplicated on an opposite side. There is contained on each side in the suspension: (1) a frame holder for pivotable support of a front or leading end of an asymmetrical leaf spring; (2) a spring end support mounted on a frame side element for carrying a rear or trailing end of the leaf spring and (3) a suitable arrangement for fastening the leaf spring at a point between their opposite ends to the axle so that the leaf spring is divided into two, self-supporting components that extend from a center line of the axle in opposite directions. The spring is formed so that one of the self-supporting components has a stiffness that is significantly higher than a stiffness of another component (hence the designation "asymmetrical"). In all forms, at least one leaf of the asymmetrical leaf springs extends along a full length of the leaf spring.

In the case of solutions in which additional leaf springs come into mechanical engagement from a predetermined deflection of the spring suspension, but the resultant progressive spring characteristic curve remains linear and has only an increased gradient. Several leaf spring elements require more installation volume and increase the weight of the spring arrangement so that weight-saving solutions were also proposed in the prior art.

WO 2016/099343 A1 describes a vehicle suspension arrangement with a leaf spring device. The leaf spring device comprises at least two leaf springs which are arranged during use in a vehicle in a longitudinal extent which generally coincides with the longitudinal extent of the vehicle, the suspension arrangement having a spring clamping unit which connects the leaf springs to an axle in the vehicle; and each of the leaf springs having end portions which are provided to be fastened in a vehicle chassis. The spring clamping unit furthermore has a spacer which is formed to separate the leaf springs in a vertical or horizontal direction. The disclosure uses the leaf spring material more effectively than known devices which leads to a reduction in weight.

Use of rubber elements has also been proposed in the prior art in order to achieve an improved, non-linear, spring characteristic curve of a vehicle suspension since rubber naturally has a non-linear, spring characteristic curve.

For example, US 2003/0038445 A1 describes a wheel suspension that contains a leaf spring or a set of leaf springs, which are in mechanical engagement with a front frame holder and a rear frame holder, the frame holders for each frame rail being in mechanical engagement with the frame rail. The leaf spring is brought into mechanical engagement by a pair of U-bolts with an axle of the vehicle. Moreover, a U-bolt seat composed of rubber with an expanded spring engagement surface is provided. The U-bolt seat is arranged between a curved part of the U-bolts and the leaf spring. Rubber spring holders are furthermore provided, which are in mechanical engagement with one of the frame rails. Each rubber spring holder comprises a rubber spring that is configured to contact the U-bolt seat in the case of an increase beyond a very light state of load of the chassis. Thereafter, the rubber spring remains in contact with the widened rubber spring engagement surface.

Another solution proposed in the prior art lies in changing the spring characteristic curve of the leaf spring device during operation.

KR 10 2007 111045 A thus describes a coordination structure of a leaf spring suspension of a vehicle using a holding bracket arrangement in order to improve driving stability and travelling comfort by controlling a length of the holding bracket arrangement.

The holding bracket arrangement comprises a tube, a rear eye of a leaf spring, a first and a second stud bolt and a first and a second bracket element. The tube is fastened by welding to a frame of a vehicle body. The rear eye of the leaf spring is installed below the tube so that the rear eye is arranged parallel to the tube. The first and second stud bolt are installed in the tube and in the rear eye of the leaf spring. The first and second bracket elements are installed in a front end and a rear end of the first and second stud bolt.

DE 10 2010 056 388 A1 further describes a vehicle, in particular a car, with a leaf spring element for suspension of the vehicle. The vehicle comprises a vehicle frame, and the leaf spring element for suspension of the vehicle, which is mounted on the vehicle frame by two bearing points. The bearing points are formed to be adjustable in order to set a spring rate and/or a standing height of the leaf spring element by changing a lever length and/or a supporting width of the leaf spring element.

Given the highlighted prior art, there is still room for improvement in the field of the longitudinal leaf spring device for suspension of a body of a motor vehicle.

SUMMARY

The object on which the disclosure is based is to provide a robust, longitudinal, leaf spring device with a non-linear, progressive, spring characteristic curve, properties of which being adjustable within as large an area as possible, wherein the longitudinal leaf spring device should be constructed in a structurally simple manner and in a cost-saving and parts-saving manner.

It should be pointed out that the features and measures listed individually in the following description can be combined with one another in any desired, technically expedient manner and highlight further configurations of the disclosure. The description characterizes and specifies the disclosure in particular additionally in conjunction with the Figures.

The longitudinal leaf spring device according to the disclosure for suspension of a body of a motor vehicle has a longitudinally formed leaf spring element and a coupling device that mechanically couples the leaf spring element to a motor vehicle axle.

According to the disclosure, a holder device is provided that has a base holder element for fixed connection to a vehicle chassis and a suspension adjustment element that faces the leaf spring element, and is fixedly connected to the base holder element. Here, the leaf spring element is connected in a front region, fixedly to the base holder element, and the front region is provided to come into mechanical bearing with the suspension adjustment element in at least one operating state.

The term "motor vehicle" should be understood within the meaning of this disclosure in particular as a car, a transporter, a heavy goods vehicle, a towing vehicle or a bus. The term "provided for" should be understood within the meaning of the disclosure in particular as specially configured or arranged for.

In this manner, a robust vehicle suspension for a motor vehicle can be provided. The vehicle suspension according to the disclosure does not require any additional auxiliary spring devices such as e.g. pneumatic springs and therefore suffices with fewer components. A desired non-linearly progressive spring characteristic curve can be achieved by using a suitably configured suspension adjustment element, as a result of which a particularly simple constructive structure can be enabled. Moreover, as a result of this, use of the leaf spring element for different variants of a motor vehicle is enabled, as a result of which, depending on the type of leaf spring element used, savings can be made in production thereof.

The coupling device can contain, for example, a pair of U-bolts which, in a manner known per se, connect a central region of the leaf spring element to a motor vehicle axle in a detachably fixed manner.

The longitudinally formed leaf spring element can be produced, for example, from steel or from composite material, also from a fiber composite, which is discussed in greater detail below.

In preferred embodiments, the suspension adjustment element comprises a surface that faces the leaf spring element and is formed to be convex in a vertical plane. As a result of this, a uniform rolling movement of the leaf spring element along the surface of the suspension adjustment element can be achieved with a low degree of surface pressure, which is therefore gentle on materials, in the case of a rising mechanical loading of the longitudinal leaf spring device, proceeding from a state loaded only with a body load.

In preferred embodiments, the suspension adjustment element comprises a surface that faces the leaf spring element, and has local radii of curvature arranged in a vertical plane, which radii of curvature change continuously as a function of a distance from a foremost point of the surface. In this manner, a very flexible possibility for setting a desired, non-linearly progressive spring characteristics curve can be achieved.

A front part of the surface of the suspension adjustment element is preferably in mechanical bearing with the leaf spring element in a state of the longitudinal leaf spring device, which is only loaded with the body load, and an angle formed at a bearing point between the surface of the suspension adjustment element and a vertical direction corresponds substantially to an angle that is formed at the bearing point between a surface of the leaf spring element that faces the surface of the suspension adjustment element and the vertical direction. In this manner, a particularly even transition from a spring characteristic curve close to a state loaded only with the body load to a desired spring characteristic curve can be achieved even in the event of a higher loading of the longitudinal leaf spring device.

If the surface, facing the leaf spring element, of the suspension adjustment element has, in the state of the longitudinal leaf spring device, only loaded with car body load, a minimum distance to the surface of the leaf spring element, which increases continuously in a backwards direction, a suspension of a body of a motor vehicle with particularly high travelling comfort can be provided.

In preferred embodiments of the longitudinal leaf spring device, at least one of the surfaces from the surface of the suspension adjustment element and a surface of the leaf spring element facing the suspension adjustment element is formed as a mechanically resistant isolation layer. Such an isolation layer can be composed, for example, of acrylonitrile-butadiene-styrene (ABS). In this manner, a longitudinal leaf spring device with a low degree of surface wear and a low level of noise generation during operation can be provided.

A fixed connection between a front region of the leaf spring element and the base holder element is preferably formed as a screw or adhesive connection. In this manner, a structurally, particularly simple solution for a longitudinal leaf spring device can be provided.

In preferred embodiments, the leaf spring element is primarily composed of a composite material. In this manner, a longitudinal leaf spring device with a particularly large weight saving can be provided.

The term "primarily" should be understood within the meaning of the disclosure in particular as a ratio of more than 50 vol. %, preferably of more than 70 vol. % and, particularly preferably, of more than 90 vol. %. In particular, the term should encompass the possibility that the leaf spring element is fully composed, i.e. by 100 vol. %, from the composite material.

The composite material can be formed, for example, as a fiber/plastic composite. In particular, the composite material can comprise carbon fiber-reinforced plastic, glass fiber-reinforced plastic and/or aramid fiber-reinforced plastic.

In preferred embodiments, the coupling device contains an acoustic separating element, comprising at least one elastomer, that acoustically uncouples the leaf spring element. In this manner, a development of noise during an operation of the longitudinal leaf spring device can be significantly reduced and existing NVH (Noise, Vibration, Harshness) requirements can be more easily satisfied.

In a further aspect of the disclosure, a motor vehicle is proposed that is equipped with at least one pair of longitudinal leaf spring devices, according to the disclosure, coupled to an axle of the motor vehicle.

The advantages described in conjunction with a proposed longitudinal leaf spring device can be transferred in their full scope to such a motor vehicle.

Further advantageous configurations of the disclosure are disclosed in the subordinate claims and the following description of the Figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Identical parts are always provided with the same reference numbers in the various figures, which is why these are also generally only described once.

Figure 1:
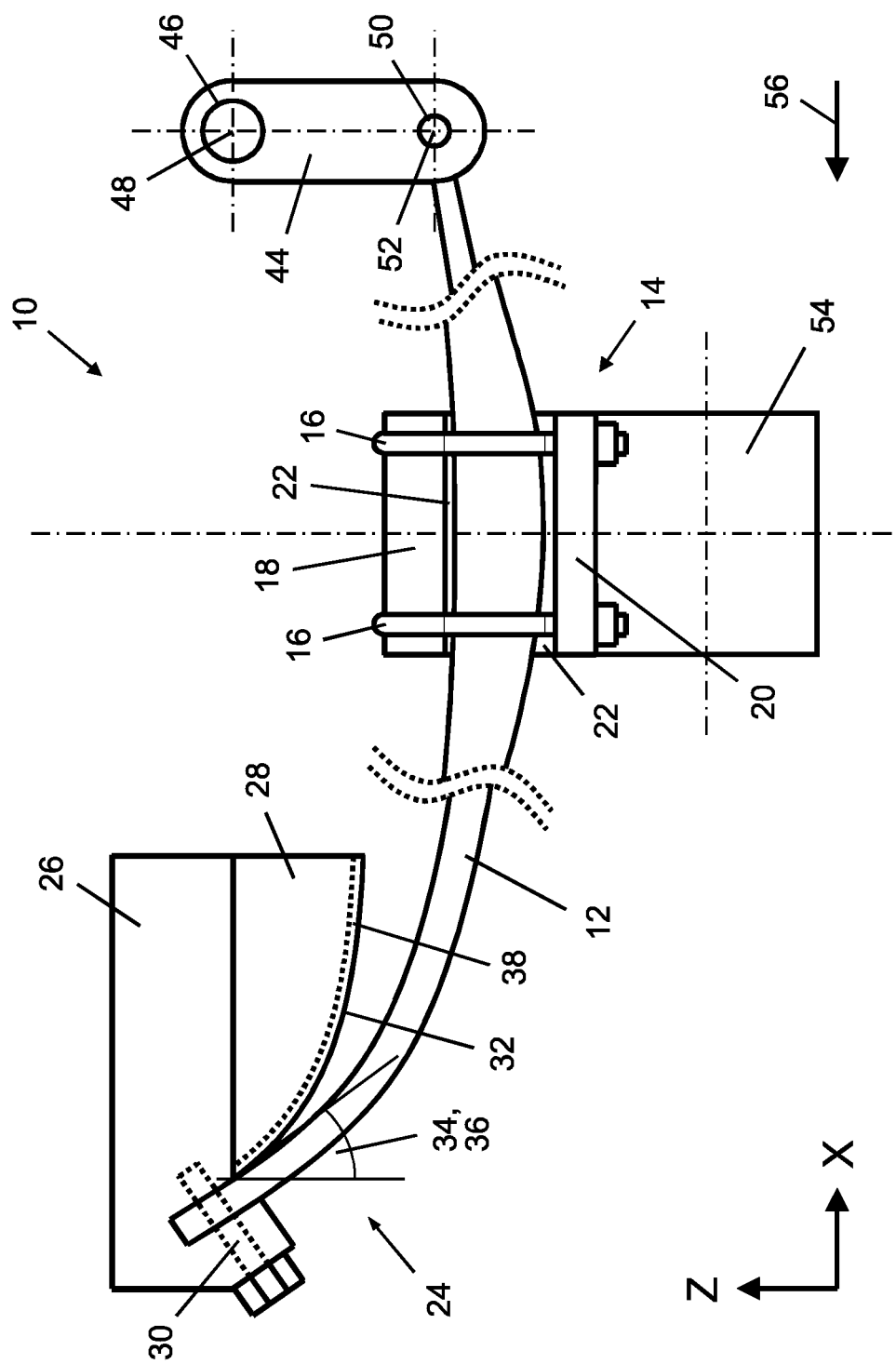
FIG. 1 shows a schematic representation of a longitudinal leaf spring device, which is coupled to an axle of a motor vehicle, in a side view.

FIG. 1 shows a schematic representation of a possible embodiment of a longitudinal leaf spring device 10, coupled to an axle 54 of a motor vehicle, in a side view. Longitudinal leaf spring device 10 serves to suspend a body of the motor vehicle, which is formed as a heavy goods vehicle or transporter. Axle 54 is formed by a rigid rear axle 54. A longitudinal leaf spring device 10 with an identical structure is provided symmetrically on an opposite side of axle 54 of the motor vehicle (not represented).

Longitudinal leaf spring device 10 contains a longitudinally formed leaf spring element 12, which is composed to a predominant ratio of more than 95 vol. % from a composite material, namely from a fiber/plastic composite. The fiber/plastic composite is embodied as a glass fiber-reinforced epoxy resin. Longitudinally formed leaf spring element 12 lies, in an installation state represented in FIG. 1, in a plane (XZ plane) that is arranged perpendicular to axle 54 of the motor vehicle and matches the drawing plane. A direction of extent of leaf spring element 12 is arranged substantially parallel to a (forward) direction of travel 56 of the motor vehicle, which runs from right to left in FIG. 1 (X-direction). Leaf spring element 12 has a substantially rectangular cross-section that varies along a direction of extent in order to achieve a predetermined spring characteristic curve of leaf spring element 12.

Longitudinal leaf spring device 10 furthermore has a coupling device 14 for mechanical coupling of leaf spring element 12 to axle 54 of the motor vehicle. Coupling device 14 has a pair of U-bolts 16 composed of steel that are spaced apart in (forward) direction of travel 56 and arranged with a U-shaped part directed upwards and comprise leaf spring element 12 in its central region. An upper transition element 18 of coupling device 14 for adjustment to leaf spring element 12 is arranged between leaf spring element 12 and the U-shaped part of U-bolts 16, and a lower transition element 20 of coupling device 14 for adjustment to axle 54 is arranged between leaf spring element 12 and the open part of the U-shape of bolts 16. Upper transition element 18 and lower transition element 20 are composed of steel. U-bolts 16 penetrate through through-bores in lower transition element 20 and are secured by screw nuts.

Coupling device 14 furthermore contains an acoustic separating element 22, which is formed as an elastomer molded part and is adapted to inner surfaces, which face leaf spring element 12, of upper transition element 18 or of lower transition element 20, and to outer contours of leaf spring element 12 in a region of coupling device 14. Acoustic separating element 22 serves, during operation of longitudinal leaf spring device 10, a purpose of acoustic uncoupling of leaf spring element 12 from coupling device 14. In the present configuration, acoustic separating element 22 is formed as a single, elastomer molded part. In alternative embodiments, the acoustic separating elements 22 can also be formed by two, separate, elastomer molded parts that are arranged between upper transition element 18 and leaf spring element 12, or between lower transition element 20 and leaf spring element 12

The motor vehicle is fitted with a mounting bracket 44, which, at a position arranged above a rear end of leaf spring element 12, is connected to the chassis (not represented) of the motor vehicle, which is formed, for example, as a ladder frame, and extends downwards. Mounting bracket 44 is equipped with cylindrical plain bearing bushes 46, 50 spaced apart in the vertical direction (Z-direction) and are composed of metal. A cylinder bolt composed of metal is guided through upper plain bearing bush 46, which cylinder bolt is connected fixedly to the chassis of the motor vehicle so that mounting bracket 44 is pivotable about an upper transverse axis 48 relative to the chassis.

A rear end of leaf spring element 12 as seen in direction of travel 56 is formed as an eye. A cylindrical metal bolt is guided through the eye. Both ends of the metal bolt are guided through two lower plain bearing bushes 50 composed of metal and arranged at the same height in mounting bracket 44 so that the rear end of leaf spring element 12 is pivotable about a lower, transverse axis 52 relative to mounting bracket 44. A filling of rubber (not represented) between plain bearing bushes 46, 50 and the cylindrical metal bolts is provided to reduce a development of noise during operation of longitudinal leaf spring device 10.

Longitudinal leaf spring device 10 furthermore has a holder device 24 with a base holder element 26 and a suspension adjustment element 28. Base holder element 26 has a substantially box-shaped form and is fixedly connected to the chassis of the motor vehicle. The connection can, for example, be embodied to be detachably fixed so that a fitter can form and release the mechanical connection in a reversible manner with the aid of a tool. The connection can, however, also be formed to be firmly bonded.

Leaf spring element 12 is fixedly connected to base holder element 26 in a front region. The fixed connection can, as represented in FIG. 1, be produced by a non-positive and positive-locking screw connection via a threaded bolt 30. Alternatively, the fixed connection can also be brought about by adhesive bond, for example, by gluing.

Suspension adjustment element 28 is connected in a detachably fixed manner to base holder element 26 on an under side of base holder element 26, facing leaf spring element 12. Suspension adjustment element 28 comprises a surface 32 that faces leaf spring element 12 and formed convexly in a vertical plane that corresponds to the drawing plane of FIG. 1.

Suspension adjustment element 28 is arranged in such a manner that a front part of surface 32 of suspension adjustment element 28 is in mechanical bearing with leaf spring element 12 in a state of longitudinal leaf spring device 10 only loaded with the body load, which state is represented in FIG. 1. An angle 34 formed at a bearing point between surface 32 of suspension adjustment element 28 and the vertical direction furthermore substantially corresponds to an angle 36 at the bearing point between a surface of leaf spring element 12 facing surface 32 of suspension adjustment element 28 and the vertical direction.

The front region of leaf spring element 12 is provided, in the event of increasing load on longitudinal leaf spring device 10, to come into mechanical bearing with a part, which is increasing in size, of surface 32 of suspension adjustment element 28 up to complete surface 32.

This continuing rolling movement of leaf spring element 12 during operation of longitudinal leaf spring device 10 during travel of the motor vehicle on surface 32 of suspension adjustment element 28 could lead to increased surface wear. For effective reduction of the surface wear, surface 32, which faces leaf spring element 12, of suspension adjustment element 28 is formed as a mechanically resistant isolation layer 38.

Figure 2:
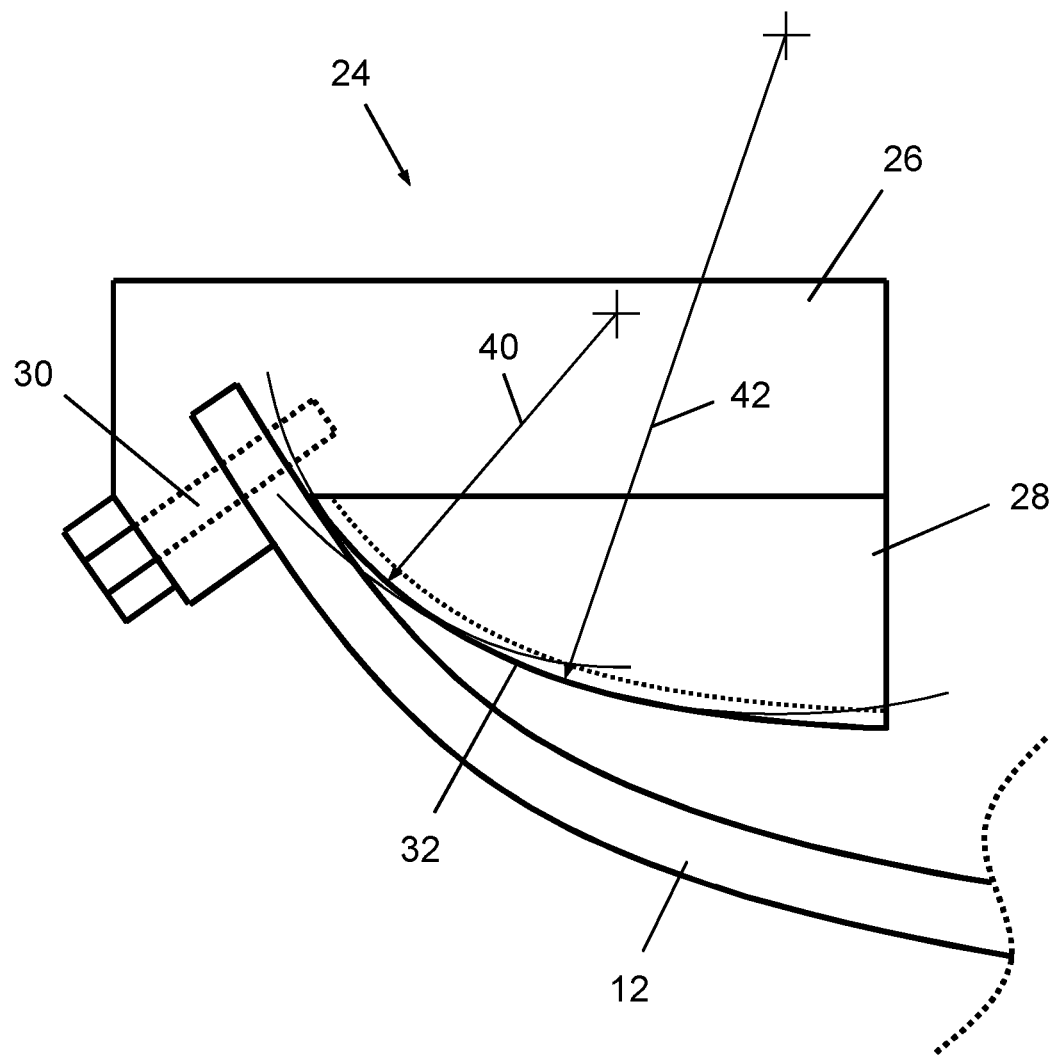
FIG. 2 shows a schematic representation of a holder device of the longitudinal leaf spring device according to FIG. 1 in a side view.

FIG. 2 shows a schematic representation of the holder device of the longitudinal leaf spring device according to FIG. 1 in a side view. Surface 32 facing leaf spring element 12 has local radii of curvature 40, 42 arranged in the vertical (XZ) plane, which change so as to become constantly larger in terms of magnitude as a function of a distance from a foremost point of surface 32. For example, two of local radii of curvature 40, 42 are represented in FIG. 1. Surface 32, facing leaf spring element 12, of suspension adjustment element 28 has, in the state in which longitudinal leaf spring device 10 is only under the car body load, a minimum distance to surface 32 of leaf spring element 12, which increases continuously in a backwards direction.

The effectively active spring characteristic curve of longitudinal leaf spring device 10 can be fixed by selection of material and geometry of leaf spring element 12, and by a configuration of a form of surface 32, facing leaf spring element 12, of suspension adjustment element 28. By changing the form of suspension adjustment element 28, in the case of an identical leaf spring element 12, a completely different, effectively active spring characteristic curve of longitudinal leaf spring device 10 can be provided so that leaf spring element 12 can be used for different variants of a motor vehicle, and thus the tool can be retained for production of leaf spring element 12.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   a longitudinal leaf springs coupled to an axle; and
   a holder having a base fixedly connected directly to a chassis of the vehicle and a suspension adjustment element fixedly connected to the base, wherein an end of the leaf spring is fixedly connected directly to the base and a region of the leaf spring immediately adjacent to the end bears against the suspension adjustment element in an operating state of the vehicle.

2. The vehicle as claimed in claim 1, wherein the suspension adjustment element has a surface that faces the leaf spring and has local radii of curvature arranged in a vertical plane, and wherein the local radii of curvature increase continuously as a function of a distance from a point of the surface adjacent to the end of the leaf spring.

3. The vehicle as claimed in claim 2, wherein a part of the suspension adjustment element surface adjacent to the end of the leaf spring is in mechanical bearing with the leaf spring in a body-loaded state being only loaded with a body load such that a first angle is formed at a bearing point between the suspension adjustment element surface and a vertical direction that corresponds to a second angle formed at the bearing point between leaf spring surface that faces the suspension adjustment element surface and the vertical direction.

4. The vehicle as claimed in claim 2, wherein the suspension adjustment element surface has, in a body-loaded state, a minimum separation distance from the leaf spring that increases continuously in a direction extending away from the end of the leaf spring.

5. The vehicle as claimed in claim 1, wherein the leaf spring is composed of a composite material.

6. A suspension for a vehicle comprising:
a longitudinal leaf spring; and
a holder having a base fixedly connected directly to a vehicle chassis and a suspension adjustment element fixedly connected to the base, wherein an end of the longitudinal leaf spring is fixedly connected directly to the base and a region of the leaf spring immediately adjacent to the end bears against the suspension adjustment element in an operating state.

7. The suspension as claimed in claim 6, wherein the suspension adjustment element has a surface that faces the leaf spring and has local radii of curvature arranged in a vertical plane, and wherein the radii of curvature increase continuously as a function of a distance from a point of the surface adjacent to the end of the leaf spring.

8. The suspension as claimed in claim 7, wherein a front part of the suspension adjustment element surface is in mechanical bearing with the leaf spring in a body-loaded state being only loaded with a body load such that a first angle is formed at a bearing point between the suspension adjustment element surface and a vertical direction that corresponds to a second angle formed at the bearing point between a leaf spring surface that faces the suspension adjustment element surface and the vertical direction.

9. The suspension as claimed in claim 7, wherein the suspension adjustment element surface has, in a body-loaded state, a minimum separation distance from the leaf spring that increases continuously in a direction extending away from the end of the leaf spring.

10. The suspension as claimed in claim 6, wherein the leaf spring is composed of a composite material.

\* \* \* \* \*